US008912692B2

(12) United States Patent
Chang et al.

(10) Patent No.: US 8,912,692 B2
(45) Date of Patent: Dec. 16, 2014

(54) MAGNETIC VIBRATOR WITH INCLINED POLE PIECES

(75) Inventors: Sean Chang, Taoyuan Hsien (TW); Ching-Hsiang Yu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 321 days.

(21) Appl. No.: 12/873,691

(22) Filed: Sep. 1, 2010

(65) Prior Publication Data

US 2011/0050008 A1   Mar. 3, 2011

(30) Foreign Application Priority Data

Sep. 2, 2009 (TW) .............................. 98129494 A

(51) Int. Cl.
*H02K 33/02* (2006.01)
*H02K 33/16* (2006.01)

(52) U.S. Cl.
CPC ..................................... *H02K 33/16* (2013.01)
USPC ................... 310/25; 310/21; 310/216.023

(58) Field of Classification Search
CPC ........................................................ H02K 33/02
USPC .................................................... 310/216.023
IPC ...................................................... H02K 33/02
See application file for complete search history.

(56) References Cited

U.S. PATENT DOCUMENTS

| 2,860,289 | A | * | 11/1958 | Verardo ................. 310/216.023 |
| 4,363,980 | A | | 12/1982 | Petersen |
| 5,107,540 | A | * | 4/1992 | Mooney et al. ............... 381/431 |
| 5,148,066 | A | | 9/1992 | Beale et al. |
| 5,214,710 | A | * | 5/1993 | Ziegenberg et al. .......... 381/412 |
| 5,942,833 | A | | 8/1999 | Yamaguchi |
| 6,151,402 | A | * | 11/2000 | Azima et al. ................... 381/396 |
| 6,192,136 | B1 | * | 2/2001 | Azima et al. ................... 381/338 |
| 6,717,305 | B2 | * | 4/2004 | Ruberl et al. ............... 310/12.24 |
| 6,777,895 | B2 | * | 8/2004 | Shimoda et al. ............... 318/114 |
| 7,288,861 | B1 | * | 10/2007 | Willard et al. ................... 310/15 |

FOREIGN PATENT DOCUMENTS

| CN | 101252305 A | 8/2008 |
| EP | 0580117 A2 | 1/1994 |
| JP | 54-94812 U | 7/1979 |
| JP | 11-215794 A | 8/1999 |
| JP | 2006-296127 A | 10/2006 |
| WO | WO-2008/013053 A1 | 1/2008 |

* cited by examiner

*Primary Examiner* — Michael Andrews
(74) *Attorney, Agent, or Firm* — Muncy, Geissler, Olds & Lowe, P.C.

(57) ABSTRACT

A magnetic vibrator including a first magnetic portion and a second magnetic portion is disclosed. The first magnetic portion includes an inner plate, a first magnet and a second magnet. The inner plate is disposed between the first magnet and the second magnet. The second magnetic portion includes a coil and a wrapper. The coil is disposed around the first magnetic portion and wrapped in the wrapper. The wrapper has a gap corresponding to the inner plate. An interval is configured between the first magnetic portion and the second magnetic portion. When a current is occurred in the coil, the first magnetic portion and the second magnetic portion are actuated to move axially with respect to each other.

18 Claims, 8 Drawing Sheets

US 8,912,692 B2

MAGNETIC VIBRATOR WITH INCLINED POLE PIECES

CROSS REFERENCE TO RELATED APPLICATIONS

This Non-provisional application claims priority under 35 U.S.C. §119(a) on Patent Application No(s). 098129494 filed in Taiwan, Republic of China on Sep. 2, 2009, the entire contents of which are hereby incorporated by reference.

BACKGROUND OF THE INVENTION

1. Field of Invention

The present invention relates to a magnetic vibrator and, in particular, to a thin magnetic vibrator able to vibrate vertically.

2. Related Art

A conventional vibrator is composed of a rotor with imbalanced weight. For example, as shown in FIG. 1A, the rotor of the vibrator described in U.S. Pat. No. 5,942,833 is composed of a coil 12, a body 10, a holder 9 and other relative elements, and the weight of the rotor is imbalanced with regard to a center axis 8. The stator of the vibrator is composed of a magnet 5, bearings 4a and 4b, a brush 7a and other relative elements. When a current is conducted to the coil 12 of the rotor by flowing through the brush 7a, the magnetic field generated by the current flowing through the coil 12 repels the magnetic field generated by the magnet 5 of the stator. Thus, the repulsive magnetic force drives the rotor to rotate about the center axis 8. Because of the imbalance in the weight of the rotor, the imbalanced centrifugal force and vibration of the rotor are generated during the rotor is rotating. Moreover, the vibration is a horizontal force with respect to the vibrator.

However, the vibration of this type of vibrator can be sensed until the motor is started and then continuously accelerated to reach a certain level of rotating speed; on contrast, after the power is cut off, the rotor cannot stop rotating and vibrating immediately due to the inertial effect, and there is still a sensible vibration effect over a span after the motor is powered off. Thus, the vibrator has a time lag with comparing to the power source or vibrating signal source. Moreover, the vibration force generated by the vibrator is along the horizontal direction rather than the vertical direction with respect to the electronic device or printed circuit board. However, in practice, the users can obviously feel the vertical vibrations stronger than the horizontal vibrations.

As shown in FIG. 1B, another type of vibrator described in U.S. Pat. No. 6,777,895 can generate vertical vibrations and has a vibrating element composed of an outer yoke 4 and a magnet 5. The magnet 5 is hollow annular-shaped, and the direction of the magnetic pole thereof is along the horizontal direction. A stator is composed of an inner coil 2 and an inner yoke 3. When a current is flowing through the inner coil 2, the generated magnetic force and the magnetic poles of the magnet 5 form either a repulsive force or an attractive force for driving the stator composed of the inner coil 2 and the inner yoke 3 to vibrate vertically.

However, there are still some defects in this design. Because vertical vibrations are generated from the vibrating element composed of the outer yoke 4 and the magnet 5, the vibrating element cannot be contacted or held such that a cover 7 is disposed to prevent the vibrations from being impeded. Thus, the size of a whole vibrator is limited, and is adverse for improvement in designing thin vibrators. Additionally, the direction of the magnetic poles of the hollow annular-shaped magnet 5 in this vibrator is horizontal. If the size of the vibrator is too small, the mass production of the vibrator is limited and it is adverse for improvement in designing thin vibrators as well.

SUMMARY OF THE INVENTION

The present invention is to provide a magnetic vibrator, especially a thin magnetic vibrator able to vibrate vertically.

To achieve the above, a magnetic vibrator in accordance with the present invention includes a first magnetic portion and a second magnetic portion. The first magnetic portion includes an inner plate, a first magnet and a second magnet. The first magnet and the second magnet are axially arranged with repulsive magnetic force. The inner plate is disposed between the first magnet and the second magnet. The second magnetic portion includes a coil and a wrapper. The coil is disposed around the first magnetic portion. The wrapper wraps the coil and has a gap corresponding to the inner plate. An interval is configured between the first magnetic portion and the second magnetic portion. The first magnetic portion and the second magnetic portion move axially with respect to each other when a current is occurred in the coil.

When the current is occurred in the coil, the second magnetic portion is in a fixed state and the first magnetic portion moves axially with respect to the second magnetic portion; otherwise, when the current is occurred in the coil, the first magnetic portion is in a fixed state and the second magnetic portion moves axially with respect to the first magnetic portion.

The first magnetic portion further includes a pair of outer plates disposed on the other sides of the first magnet and the second magnet opposite to the inner plate, respectively. The magnetic vibrator further includes a plurality of flexible elements disposed on two ends of the first magnetic portion or the second magnetic portion to drive the first magnetic portion or the second magnetic portion to return to its initial position.

The distance between each of the two ends of the first magnetic portion and the second magnetic portion is preferably larger than the distance between the center of the first magnetic portion and the second magnetic portion. The wrapper includes an inclined surface or an arc surface corresponding to each of the two ends of the first magnetic portion, respectively, and the inclined surface or the arc surface inclines from the outside toward the center of the first magnet portion. The wrapper includes two protruding portions at the two sides of the gap extending toward the first magnetic portion.

The gap of the wrapper is larger than the distance from the center of the second magnetic portion to the first magnetic portion.

The second magnetic portion further includes a separator disposed in the wrapper, and the separator separates the coil into two portions and protrudes out of the gap of the wrapper.

When each of a surface of the first magnet and a surface of the second magnet contacting the inner plate is an N pole, magnetic lines generated by the first magnet and the second magnet extend radially and outwardly from the inner plate toward the gap of the wrapper; when each of a surface of the first magnet and a surface of the second magnet contacting the inner plate is an S pole, magnetic lines generated by the first magnet and the second magnet extend radially and inwardly from the gap of the wrapper toward the inner plate.

The wrapper is a hollowly annular body disposed around the first magnetic portion, and the wrapper has a space inside for accommodating the coil. An axial cross-section of the wrapper is preferably rectangular, hexagonal, polygonal, circular, elliptic or irregular.

The inner plate, the wrapper, the separator or the outer plate is preferably a yoke iron. The first magnet, the second magnet, the inner plat or the outer plate is preferably circular disk-shaped or polygonal disk-shaped. An axial height of the second magnetic portion is higher or lower than, or equal to an axial height of the first magnetic portion.

To achieve the above, the magnetic vibrator in accordance with the present invention includes a first magnetic portion and the second magnetic portion. The first magnetic portion includes a pair of outer plates, a first magnet and a second magnet. The first magnet and the second magnet are axially arranged with repulsive magnetic force. The pair of outer plates is disposed outside the first magnet and the second magnet, and the first magnet and the second magnet are disposed between the pair of the outer plates. The second magnetic portion includes a coil and a wrapper. The coil is disposed around the first magnetic portion. The wrapper wraps the coil, and has a gap corresponding to the center of the first magnetic portion. An interval is configured between the first magnetic portion and the second magnetic portion. The first magnetic portion and the second magnetic portion move axially with respect to each other when a current is occurred in the coil.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
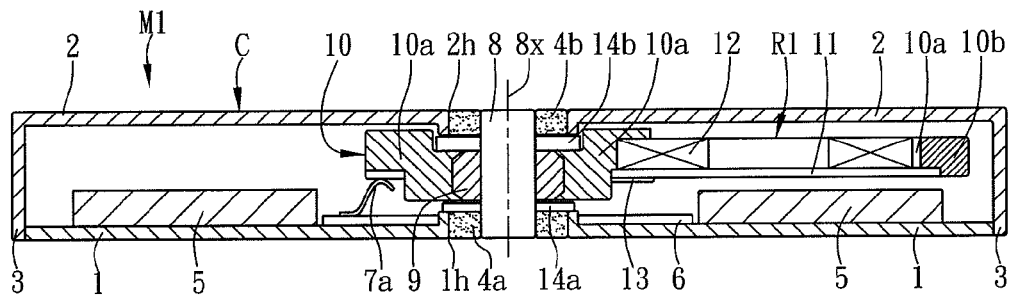
FIGS. 1A and 1B are schematic figures showing conventional vibrators.
Figure 1B:
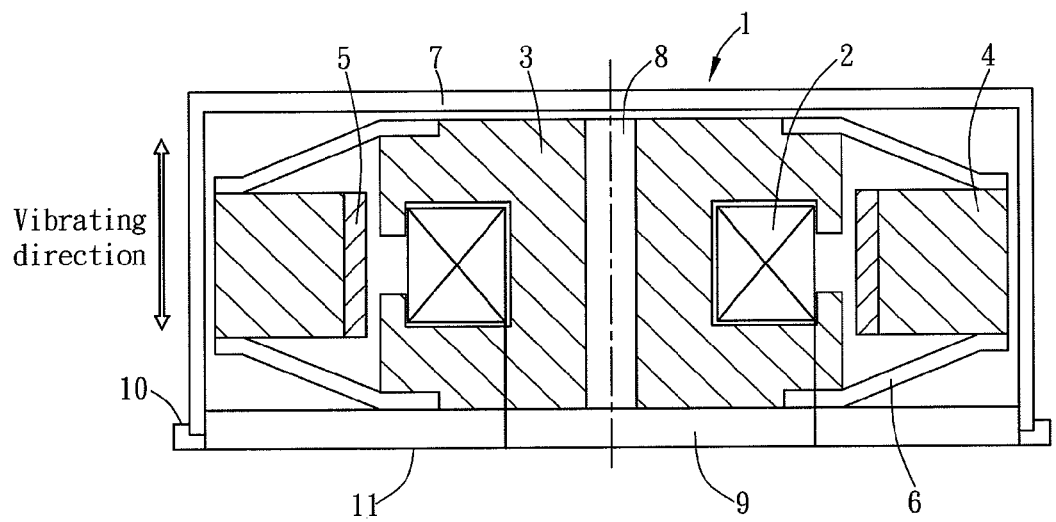
Figure 2:
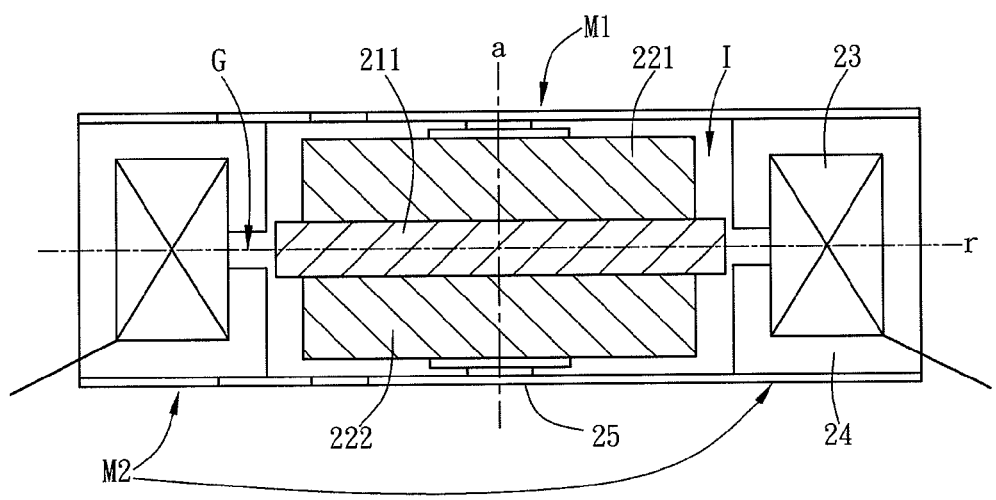
FIG. 2 is a cross-sectional figure showing a magnetic vibrator in accordance with a preferred embodiment of the present invention.

FIG. 2 is a cross-sectional figure of a magnetic vibrator in accordance with a preferred embodiment of the present invention. The magnetic vibrator includes a first magnetic portion M1 and a second magnetic portion M2. The first magnetic portion M1 includes an inner plate 211, a first magnet 221 and a second magnet 222. The first magnet 221 and the second magnet 222 are axially arranged along the axis a with repulsive magnetic forces. The inner plate 211 is disposed between the first magnet 221 and the second magnet 222. The second magnetic portion M2 includes a coil 23 and a wrapper 24. The coil 23 is disposed around the first magnetic portion M1. The wrapper 24 wraps the coil 23. The second magnetic portion M2 has a gap G corresponding to the inner plate 211. An interval S is configured between the first magnetic portion M1 and the second magnetic portion M2. The first magnetic portion M1 and the second magnetic portion M2 move axially along the axis a with respect to each other when a current is occurred in the coil. In the present embodiment, the first magnetic portion M1 moves axially along the axis a with respect to the second magnetic portion M2. However, if it is desired, the first magnetic portion M1 can be in a fixed state and the second magnetic portion M2 moves along the axis a with respect to the first magnetic portion M1. The magnetic vibrator of the present embodiment further includes a plurality of flexible elements 25 disposed on two ends of the first magnetic portion M1 or the second magnetic portion M2 to drive the first magnetic portion M1 or the second magnetic portion M2 to return to its initial position axially along the axis a.

Figure 3A:
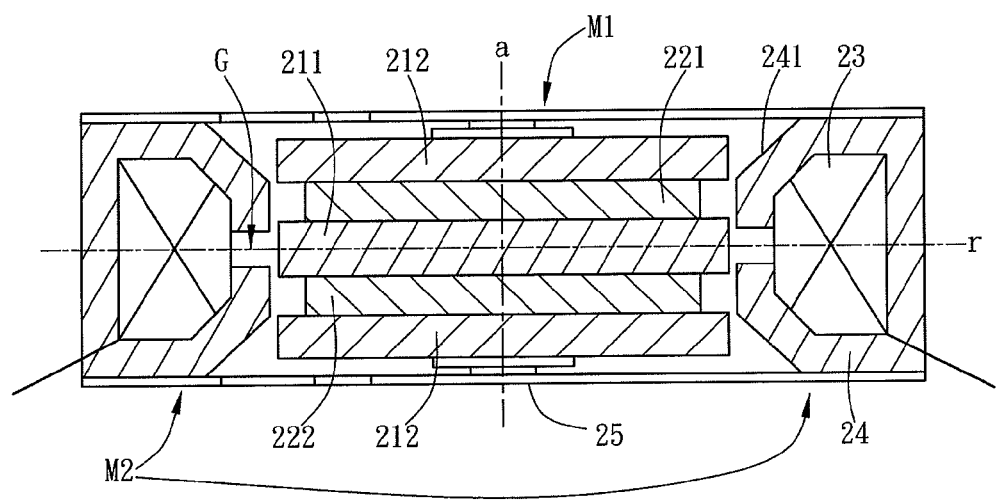
FIGS. 3A and 3F are cross-sectional figures of the magnetic vibrator with outer plates in accordance with the preferred embodiment of the present invention.

As shown in FIG. 3A, the first magnetic portion M1 further includes a pair of outer plates 212 disposed on the other sides of the first magnet 221 and the second magnet 222 opposite to the inner plate 211, respectively.

The wrapper 24 is preferably a hollowly annular body disposed around the first magnetic portion M1, and the wrapper 24 has a space inside for accommodating the coil 23. As shown in FIGS. 2 and 3A, an axial cross-section of the wrapper 24 is preferably rectangular or hexagonal; furthermore, the axial cross-section of the wrapper 24 may be polygonal, circular, elliptic or irregular as well.

Figure 3B:
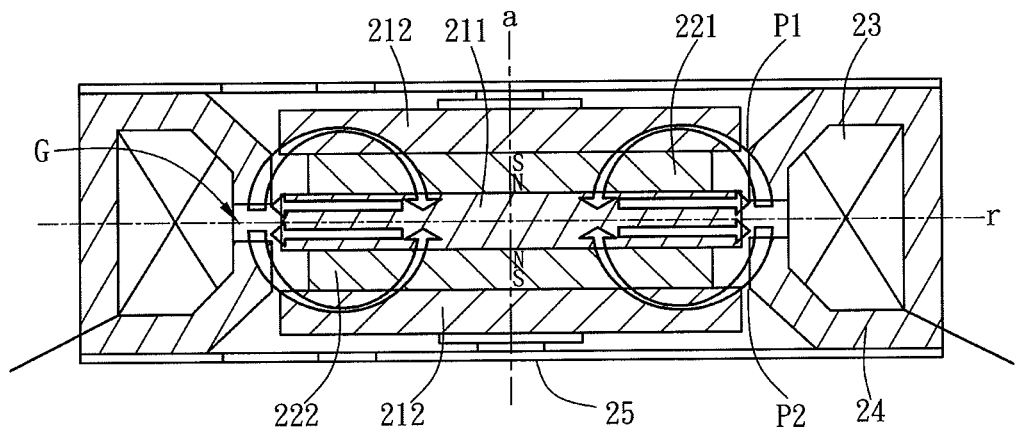
FIGS. 3B and 3C are schematic figures showing the distribution of magnetic lines generated by the first magnet and the second magnet shown in FIG. 3A.

As shown in FIG. 3B, when each of a surface of the first magnet 221 and a surface of the second magnet 222 contacting the inner plate 211 is an N pole, the magnetic lines P1 generated by the first magnet 221 and the magnetic lines P2 of the second magnet 222 extend outwardly along the radius r from the inner plate 211 toward the gap G of the wrapper 24. Then, the magnetic lines P1 and P2 extend upward and downward to the wrapper 24, simultaneously, and further enter the outer plate 212 from the wrapper 24 close to the outer edges of the outer plates 212. Then, the magnetic lines P1 and P2 return to the inner plate 211 by passing through the first magnet 221 and the second magnet 222 inwardly.

Figure 3C:
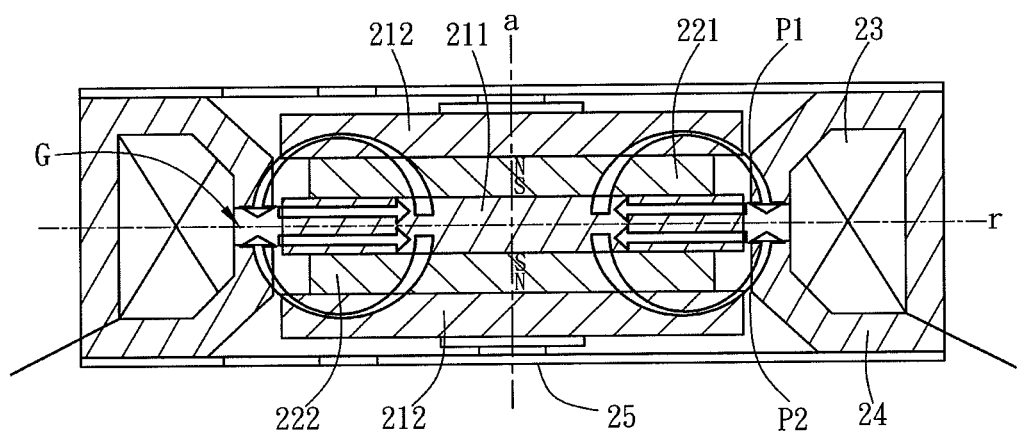
Figure 3D:
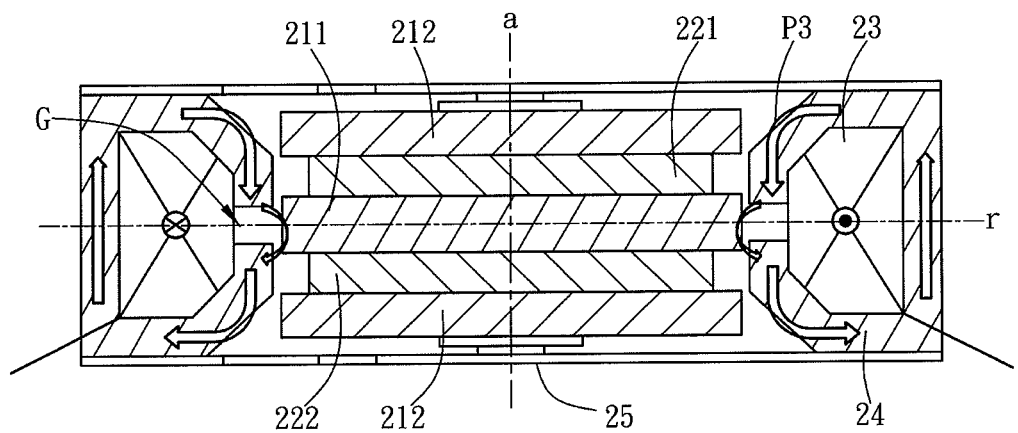
FIGS. 3D and 3E are schematic figures showing the distribution of magnetic lines generated when the current flows through the coil as shown in FIG. 3A.

As shown in FIG. 3D, when the current flows through the coil 23 in clockwise, the generated magnetic lines P3 circumrotate in the wrapper 24. In addition, when the circumrotating magnetic lines P3 from the upper edge approach the central gap G, the magnetic lines P3 enters into the lower edge through the inner plate 211 so as to form the entire loop. Meanwhile, the magnetic lines P1 generated by the first magnet 221 and the magnetic lines P3 generated by the current flowing through the coil 23 encounter at the gap in the center of the wrapper 24, and then generate a repulsive force to press down the first magnetic portion M1. In addition, the magnetic lines P2 generated by the second magnet 222 and the magnetic lines P3 generated by the current flowing through the coil 23 encounter at the gap in the center of the wrapper 24, and then generate an attractive force to press down the first magnetic portion M1 as well.

Figure 3E:
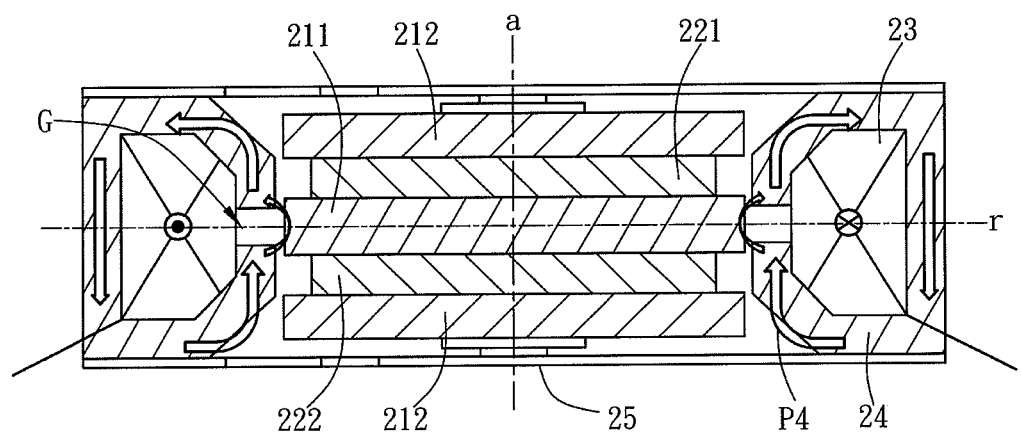

As shown in FIG. 3E, in the same way, when the current flows through the coil 23 in counterclockwise (viewing from the top), the magnetic lines P1 generated by the first magnet 221 and the magnetic lines P4 generated by the current flowing through the coil 23 generate an attractive force to push up the first magnetic portion M1. Additionally, a repulsive force occurred by the magnetic lines P2 generated by the first magnet 222 and the magnetic lines P4 generated by the current flowing through the coil 23 pushes up the first magnetic portion M1 as well.

Otherwise, as shown in FIG. 3C, when each of a surface of the first magnet 221 and a surface of the second magnet 222 contacting the inner plate 211 is an S pole, the magnetic lines P1 generated by the first magnet 221 and the magnetic lines P2 of the second magnet 222 extend outwardly along the radius r from the gap G of the wrapper 24 toward the inner plate 211. The magnetic lines P1 and P2 further extend upward and downward to enter the outer plates 212 by passing through the first magnet 221 and the second magnet 222, simultaneously. Afterward, the magnetic lines P1 and P2 enter the wrapper 24 at the outer edges of the outer plates 212, and then extend from the upper and lower edges to the gap G in the center of the wrapper 24. As regards the repulsive or attractive relationships between the magnetic lines generated by the first magnet 221 or the second magnet 222 and the magnetic lines generated by the current, they are similar to that shown in FIG. 3B and the detailed description thereof will be omitted.

Accordingly, the change in direction (clockwise or counterclockwise) of the current flowing through the coil 23 can vary direction of the generated magnetic force and the movement direction of the first magnetic portion M1. In addition, the adjustment of the switching rate with regard to the direction of the current flowing through the coil 23 can vary the vertical vibration frequency of the first magnetic portion M1, and the variation in strength of the current flowing through the coil 23 can adjust the strength of vibration force of the first magnetic portion M1.

Figure 3F:
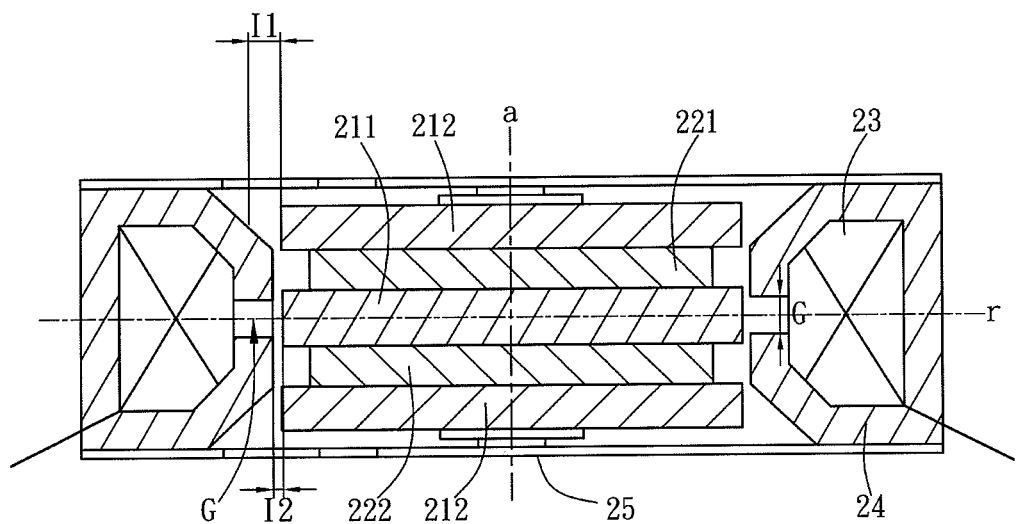

Moreover, as shown in FIG. 3F, the distance I1 between each of the two ends of the first magnetic portion M1 and the second magnetic portion M2 is preferably larger than the distance 12 between the center of the first magnetic portion M1 and the second magnetic portion M2. The gap G of the wrapper 24 is preferably larger than the distance 12 from the center of the second magnetic portion M2 to the first magnetic portion M1.

Figure 4:
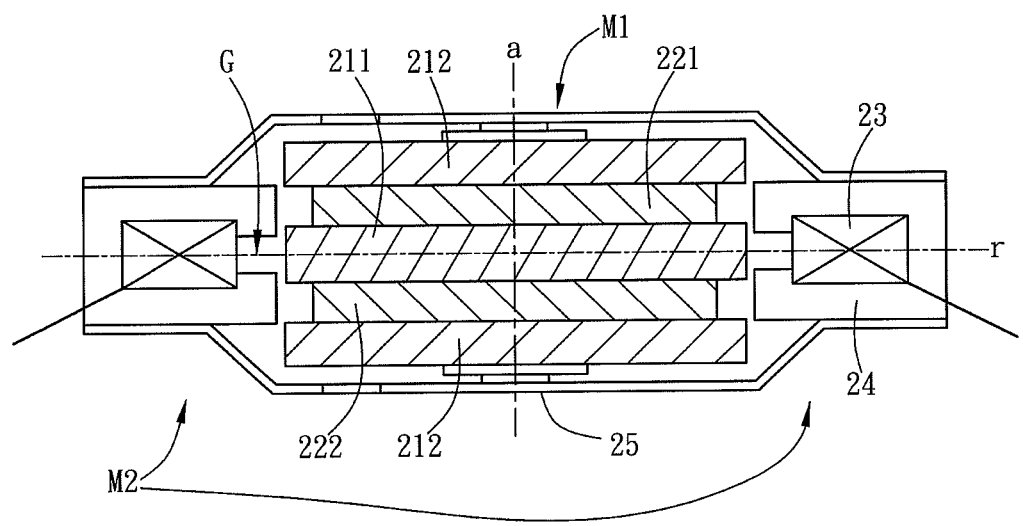
FIGS. 4 to 9 are cross-sectional figures showing various magnetic vibrators in accordance with other preferred embodiments of the present invention.

As shown in FIG. 2 or 3A, the height of the second magnetic portion M2 along the axis a can be higher than the height of the first magnetic portion M1 along the axis a, or, as shown in FIG. 4, lower than that of the first magnetic portion M1 along the axis a, or equal to that of the first magnetic portion M1 along the axis a.

Figure 6:
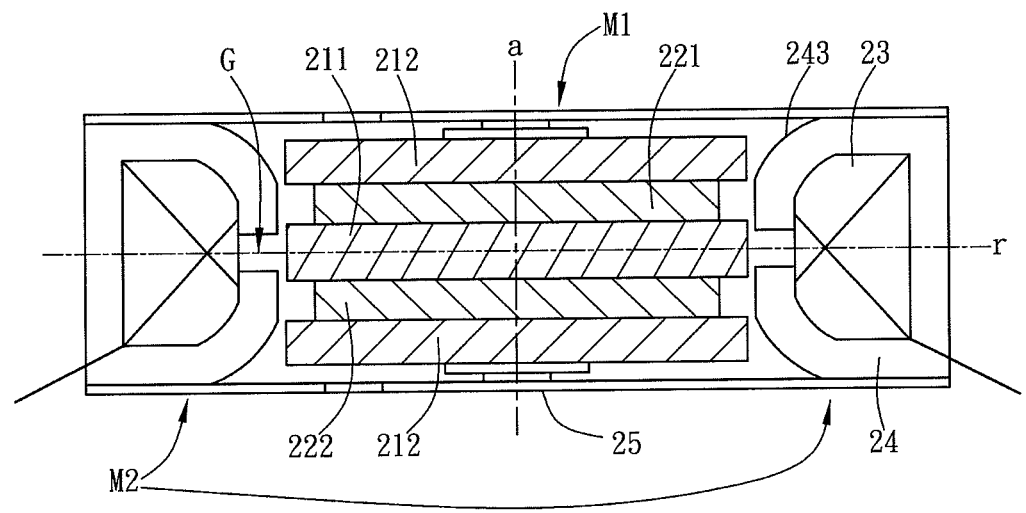
Figure 7:
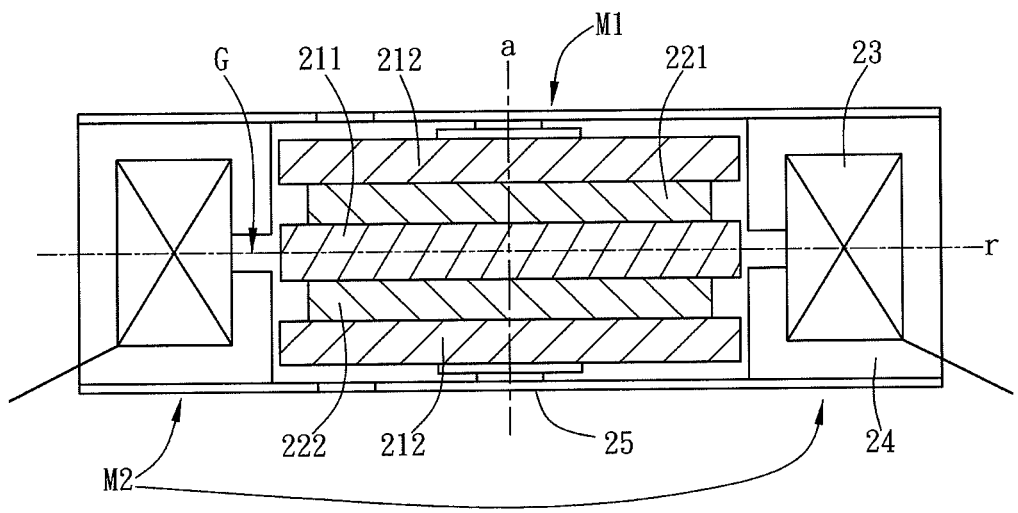

As shown in FIG. 3A, the wrapper includes an inclined surface 241 corresponding to each of the two ends of the first magnetic portion M1, respectively, and the inclined surface 241 inclines from the outside toward the center of the first magnet portion M1. Otherwise, as shown in FIG. 6, the inclined surfaces 241 can be substituted with arc surfaces 243.

Figure 5:
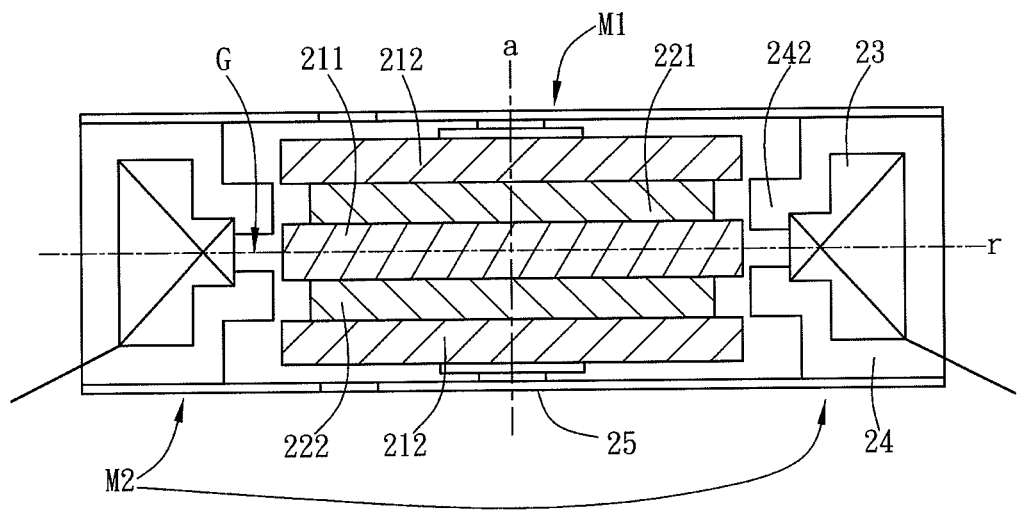

As shown in FIG. 5, the wrapper 24 includes two protruding portions at the two sides of the gap G extending toward the first magnetic portion M1.

Figure 9:
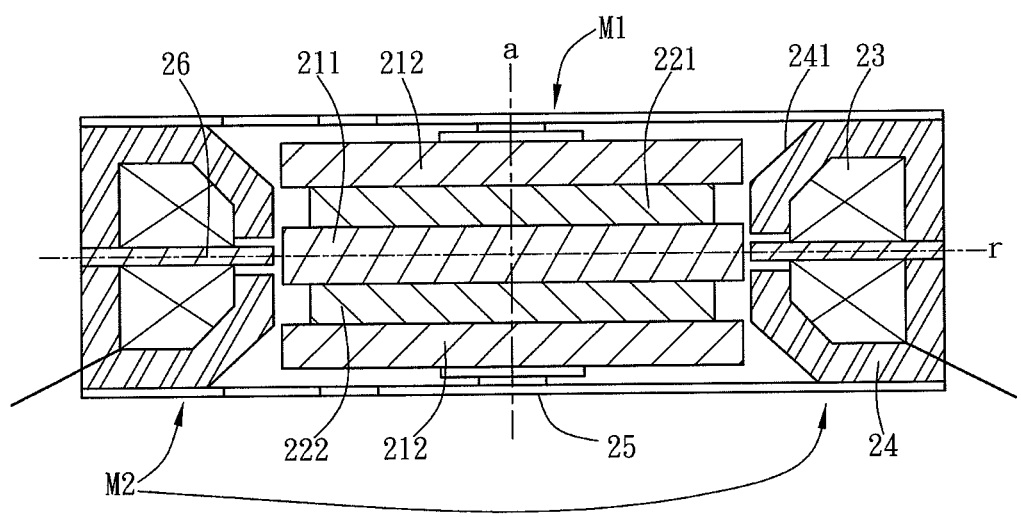

As shown in FIG. 9, the second magnetic portion M2 can further comprise a separator 26 disposed in the wrapper 24. The separator separates the coil 23 into two portions and protrudes out of the gap of the wrapper 24.

Figure 8:
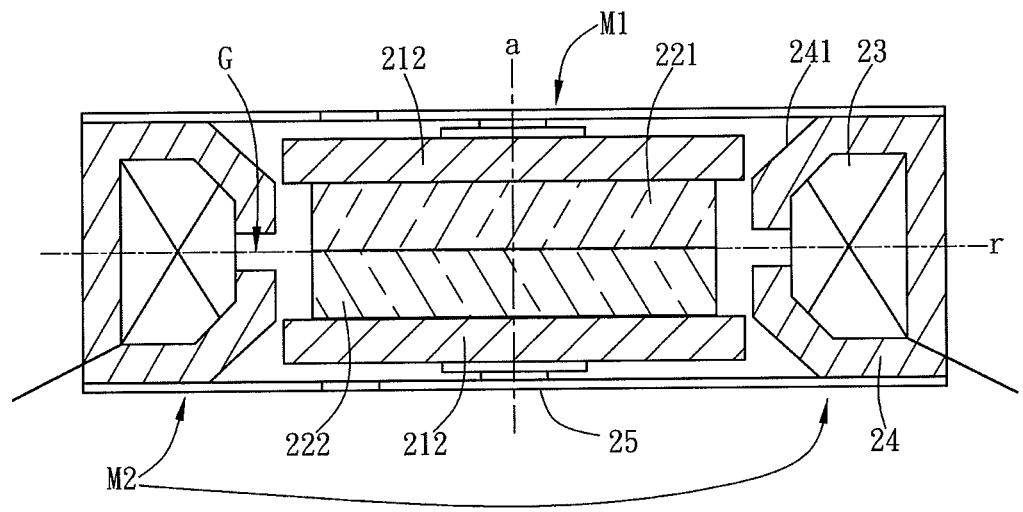

As shown in FIG. 8, the magnetic vibrator shown in FIG. 3A can be without the inner plate 211.

The inner plate 211, the wrapper 24, the separator 26 or the outer plate 212 is preferably a yoke. The first magnet 221, the second magnet 222, the inner plat 211 or the outer plate 212 is preferably circular disk-shaped or polygonal disk-shaped.

In summary, the magnetic vibrator of the present invention can vibrate vertically. For users, the vibrations generated by the magnetic vibrator can be easily sensed. Additionally, the magnetic vibrator of the present invention is not limited by a cover, and is suitable for a thin magnetic vibrator. The magnets used in the magnetic vibrator of the present invention are flat magnets with vertical magnetic poles. The manufacturing process of the certain magnets is simpler than that of annular-shaped magnets with horizontal magnetic poles. Moreover, in accordance with the present invention, when a current occurs in the coil, the magnetic field generated by the current can immediately form a repulsive force or an attractive force with the magnet so as to generate vibrations. The magnetic vibrator can generate real-time response according to a power source or a vibrating signal source. The magnetic vibrator of the present invention also can generate different types of vibrations to satisfy needs of different sorts of vibration satiations by being inputted different power sources or vibrating signal sources.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A magnetic vibrator comprising:
   a first magnetic portion comprising a first magnet, a second magnet and an inner plate disposed between the first magnet and the second magnet; and
   a second magnetic portion comprising a coil disposed around the first magnetic portion and a wrapper wrapping the coil and having a gap, wherein the coil has an upper surface, a lower surface disposed opposite to the upper surface, an inner surface and an outer surface disposed opposite to the inner surface, the outer surface is connected to the upper surface and the lower surface, and the inner surface is disposed opposite to the first magnetic portion;
   wherein an interval is configured between the first magnetic portion and the second magnetic portion, and the first magnetic portion and the second magnetic portion move axially with respect to each other when a current is occurred in the coil,
   wherein the wrapper covers the upper surface, the lower surface and the outer surface of the coil, the wrapper extends to the inner surface along an axis of the magnetic vibrator from the upper surface and the lower surface to cover a part of the inner surface to form the gap corresponding to a position of the inner plate,
   wherein magnetic lines generated by the first magnet and the second magnet extend outwardly from the inner plate toward the gap, and the magnetic lines return to the inner plate by passing through the first magnet and the second magnet, or magnetic lines generated by the first magnet and the second magnet extend from the gap of the wrapper toward the inner plate,
   wherein the first magnetic portion further comprises a pair of outer plates disposed on the other sides of the first magnet and the second magnet opposite to the inner plate, respectively, and the pair of outer plates is located within a space formed by the coil.

2. The magnetic vibrator of claim 1, wherein the first magnet and the second magnet are axially arranged with repulsive magnetic force.

3. The magnetic vibrator of claim 1, wherein when the current is occurred in the coil, the second magnetic portion is in a fixed state and the first magnetic portion moves axially with respect to the second magnetic portion; or when the current is occurred in the coil, the first magnetic portion is in a fixed state and the second magnetic portion moves axially with respect to the first magnetic portion.

4. The magnetic vibrator of claim 1, wherein the inner plate, the wrapper or the outer plate is a yoke iron.

5. The magnetic vibrator of claim 1, wherein the first magnet, the second magnet, the inner plat or each of the outer plate is circular disk-shaped or polygonal disk-shaped.

6. The magnetic vibrator of claim 1, further comprising: a plurality of flexible elements disposed on two ends of the first magnetic portion or the second magnetic portion to drive the first magnetic portion or the second magnetic portion to return to its initial position.

7. The magnetic vibrator of claim 1, wherein the distance between each of the two ends of the first magnetic portion and the second magnetic portion is larger than the distance between the center of the first magnetic portion and the second magnetic portion.

8. The magnetic vibrator of claim 7, wherein the wrapper comprises an inclined surface or an arc surface corresponding to each of the two ends of the first magnetic portion, respectively, and the inclined surface or the arc surface inclines from the outside toward the center of the first magnet portion.

9. The magnetic vibrator of claim 7, wherein the wrapper comprises two protruding portions at the two sides of the gap extending toward the first magnetic portion.

10. The magnetic vibrator of claim 1, wherein the gap of the wrapper is larger than the distance from the center of the second magnetic portion to the first magnetic portion.

11. The magnetic vibrator of claim 1 wherein the second magnetic portion further comprises a separator disposed in the wrapper, and the separator separates the coil into two portions and protrudes out of the gap of the wrapper.

12. The magnetic vibrator of claim 11, wherein the separator is a yoke iron.

13. The magnetic vibrator of claim 1, wherein each of a surface of the first magnet and a surface of the second magnet contacting the inner plate is an N pole.

14. The magnetic vibrator of claim 1, wherein each of a surface of the first magnet and a surface of the second magnet contacting the inner plate is an S pole.

15. The magnetic vibrator of claim 1, wherein the wrapper is a hollowly annular body disposed around the first magnetic portion.

16. The magnetic vibrator of claim 15, wherein an axial cross-section of the wrapper is rectangular, hexagonal, polygonal, circular, elliptic or irregular, and the wrapper has a space inside for accommodating the coil.

17. The magnetic vibrator of claim 1, wherein an axial height of the second magnetic portion is higher or lower than, or equal to an axial height of the first magnetic portion.

18. A magnetic vibrator comprising:
a first magnetic portion comprising a first magnet, a second magnet stacked on the first magnet, and a pair of outer plates disposed outside the first magnet and the second magnet; and
a second magnetic portion comprising a coil disposed around the first magnetic portion and a wrapper wrapping the coil and having a gap, wherein the coil has an upper surface, a lower surface disposed opposite to the upper surface, an inner surface and an outer surface disposed opposite to the inner surface, the outer surface is connected to the upper surface and the lower surface, and the inner surface is disposed opposite to the first magnetic portion;
wherein an interval is configured between the first magnetic portion and the second magnetic portion, and the first magnetic portion and the second magnetic portion move axially with respect to each other when a current is occurred in the coil, wherein the wrapper covers the upper surface, the lower surface and the outer surface of the coil, and extends to the inner surface along an axis of the magnetic vibrator from the upper surface and the lower surface to cover a part of the inner surface so as to form the gap corresponding to an interface between the first magnet and the second magnet,
wherein the pair of outer plates is located within a space formed by the coil.

* * * * *